United States Patent [19]

Spence-Bate et al.

[11] 4,118,123
[45] Oct. 3, 1978

[54] EDITORS FOR MICROFICHE CAMERAS

[75] Inventors: Harry Arthur Hele Spence-Bate, 1 Cheam Place, Morley, Australia, 6062; Michael Edwin Wilson, Perth, Australia

[73] Assignee: Harry Arthur Hele Spence-Bate, Morley, Australia

[21] Appl. No.: 808,543

[22] Filed: Jun. 21, 1977

[30] Foreign Application Priority Data

Jun. 23, 1976 [GB] United Kingdom ............... 26155/76
Jul. 2, 1976 [AU] Australia ............... 6518/76

[51] Int. Cl.² ............ G03B 27/00; G03B 27/54; G03B 27/62; G03B 27/02
[52] U.S. Cl. ............ 355/78; 355/1; 355/70; 355/76; 355/132
[58] Field of Search ............ 355/53, 54, 44, 64, 355/46, 39, 1, 78, 79, 89, 113, 114, 132, 40, 73, 76, 70, 77

[56] References Cited

U.S. PATENT DOCUMENTS

| 3,041,930 | 7/1962 | Davidson | 355/77 X |
|---|---|---|---|
| 3,064,525 | 11/1962 | Lemche | 355/76 |
| 3,200,730 | 8/1965 | Heier | 355/78 |
| 3,433,565 | 3/1969 | Roush | 355/77 |
| 3,479,119 | 11/1969 | Miller et al. | 355/70 X |
| 3,815,986 | 6/1974 | Darbee | 355/1 |
| 3,907,426 | 9/1975 | Goodliffe | 355/53 |
| 4,012,122 | 3/1977 | McVeigh | 355/40 X |
| 4,043,663 | 8/1977 | Lein | 355/73 |

Primary Examiner—Donald A. Griffin
Attorney, Agent, or Firm—Fidelman, Wolffe & Waldron

[57] ABSTRACT

A microfiche editing device for copying images contained in several microfiche frames on a first microfiche simultaneously onto a second at least partly unexposed microfiche; the device includes an array of illuminating means which can be selectively brought into use each to project light through a selected frame on the first microfiche so as to expose frames of the second microfiche placed in contact with the first microfiche; the illuminating means may include either a hinged mirror arrangement or a fibre optic arrangement which feed light into a collimating array of cells each of which correspond to a microfiche frame of the first microfiche. The second microfiche can be formed either by placing the emulsion the same way up as that of the first microfiche or alternatively by placing the emulsion of the second microfiche face to face with the emulsion on the first microfiche; in the latter case a reverse image is produced which can be used to generate further obverse images or which can be used with a further obverse microfiche to produce a composite microfiche formed of an obverse and reverse microfiche held together so that images on one microfiche may be seen through blank frames in the other microfiche.

10 Claims, 6 Drawing Figures

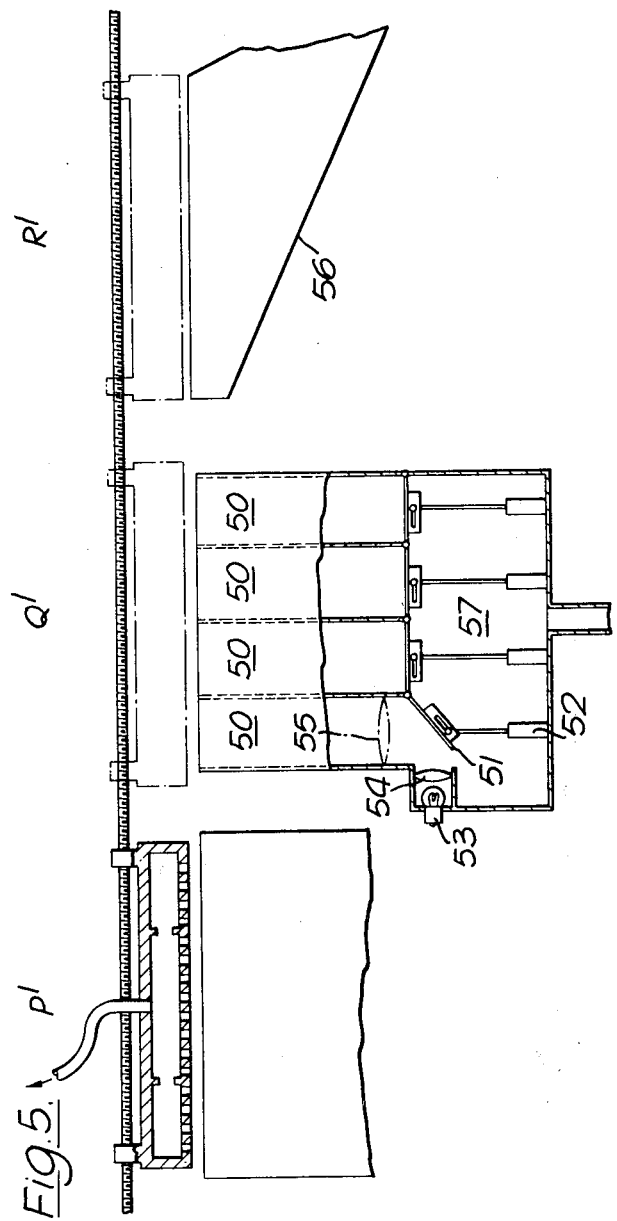

EDITORS FOR MICROFICHE CAMERAS

The present invention relates to editors for microfiche cameras and a method of editing microfiches.

In my British Pat. No. 1,449,413 there is described an editing device in which a first microfiche, having images recorded in frames thereon, is positioned under a second microfiche and light is projected through a desired image on the first microfiche onto a desired frame of the second microfiche to record the desired image on the desired frame. Such a device is simple and relatively cheap to manufacture, but if more than one or two images are desired to be transferred the operation is very time-consuming, because each image has to be recorded separately. Another disadvantage is that operator fatigue tends to induce errors in selecting the desired images and desired frames.

According to the invention there is therefore provided a microfiche editing device including an array of illuminating means, means for holding a first microfiche on the device, each illuminating means corresponding to a frame on the microfiche, means for holding and positioning a second, at least partly unexposed, microfiche in alignment with the first microfiche, and a control means controlling each illuminating means to project light through any one or more desired frames on the first microfiche onto an unexposed frame or frames on the second microfiche.

The array of illuminating means is preferably provided at the base of a cellular structure, formed with a plurality of cells each having a rectilinear cross section substantially the same as each said frame, and the length of each cell being longer than the longest side of the cross section as taken from the base to the head of each cell, each illuminating means being at the base of each cell, the head of each cell being in a single plane so as to form a grid onto which the first microfiche can be held in the said single plane.

An advantage of the cellular structure is that if each cell is provided with parallel walls between the head and base of each cell, each cell acts as a collimator directing light rays within each cell at right angles to microfiche located in the said single plane.

In a preferred embodiment of the invention the means for holding the first microfiche on the device comprises a vacuum chamber, ducts connecting the chamber to each cell, the chamber being connectable to a source of pressure lower than the ambient atmosphere.

In one embodiment of the invention each illuminating means comprises a mirror hinged to the base of each cell which can be shut to exclude light from the cell or opened to direct light from a lamp associated with the device. The opening and closing of each mirror is controlled by the control means. One lamp can provide the illumination for one or more cells.

In a second embodiment of the invention the cells are each illuminated by means of a fibre optic, one end of which is located at the base of each cell and the other end of which is held in a terminal member which can be moved into alignment or misalignment relative to a further terminal member. The further terminal member may be illuminated either directly or indirectly by a lamp. Alignment or misalignment is controlled by the control means, suitably by means of solenoids, but this may be by manual means.

The invention also consists in a method of copying a plurality of selected images in different frames of one microfiche onto another unexposed microfiche comprising placing both microfiche together and projecting light through the plurality of images to expose a plurality of frames of the unexposed microfiche simultaneously to the plurality of selected images.

The invention also consists in a method of copying at least a part of the images of one microfiche onto unexposed parts of a second mecrofiche comprising placing both microfiches on the editing device of the invention and projecting light through the said part of the one microfiche onto the second microfiche.

The invention further consists in a method of copying at least one frame of one microfiche onto a second unexposed microfiche comprising placing both microfiches together emulsion to emulsion and projecting light through at least part of the one microfiche on the second microfiche.

The invention will now be described with reference to the accompanying drawings in which:

FIG. 5 shows the editing device according to a second embodiment of the invention.

Figure 1:
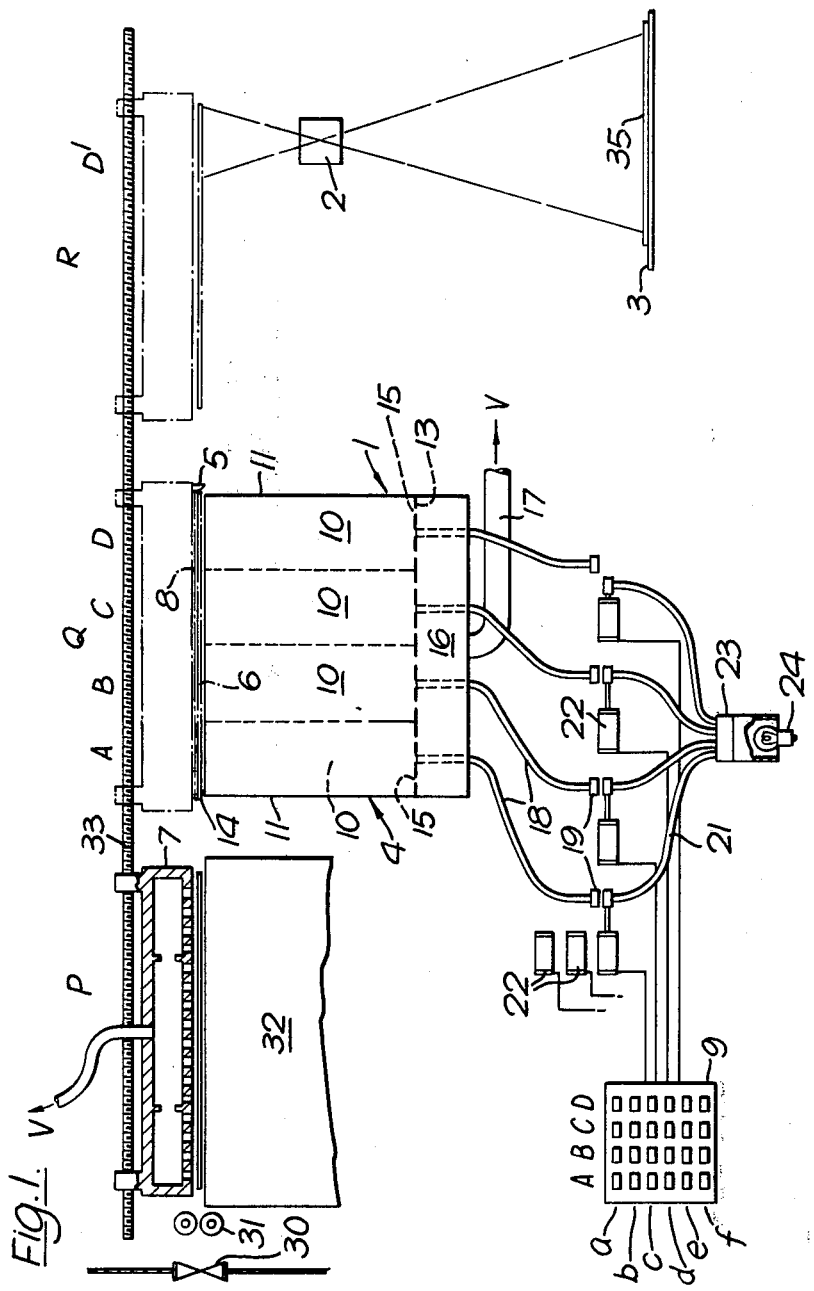
FIG. 1 shows diagrammatically an editing device according to one embodiment of the invention incorporated in a microfiche camera.

In FIG. 1 there is shown an editing device 1 which is incorporated in a microfiche camera, the lens 2 and the document platten 3 of which only are shown. Various more detailed descriptions of microfiche cameras suitable for use with the device are shown in my other patent and patent applications.

Very basically, the microfiche editing device according to the invention includes illuminating means 4 which will be discussed later in more detail, means 5 for holding a first microfiche 6 on the device 1, means 7 for holding and positioning a second microfiche 8 in alignment with the first microfiche 6, and the control means 9 controlling each illuminating means 4 to project light through in one or more desired frames on the first microfiche 6 on to an unexposed frame or frames on the second microfiche 8. The illuminating means are formed into an array of collimating light cells 10, incorporated into a structure 4. Each cell 10 has a rectangular cross section, as may be seen in FIG. 2, substantially the same area as any one frame on the first microfiche. Each cell is elongate, and the length of each cell is longer than the longest side of the cross section as taken from the base 13 to the head 14 of each cell. Walls 11 form the sides of each cell. The longest side of the cross section is shown at 12. The head 14 of each cell is in a single plane so as to form a grid onto which the first microfiche can be held in the single plane.

At the base of each cell 10 there are provided ducts 15 which communicate between each cell 10 and a vacuum chamber 16. The vacuum chamber 16 is connected by a conduit 17 to a source of vacuum, or at least a pressure lower than the ambient pressure. Also provided at the base 13 of each cell 10 is a fibre optic or bundle of fibre optics 18, which connect between the base of each cell and a terminal member 19. The terminal member 19 is shown in greater detail in FIG. 3.

Figure 3:
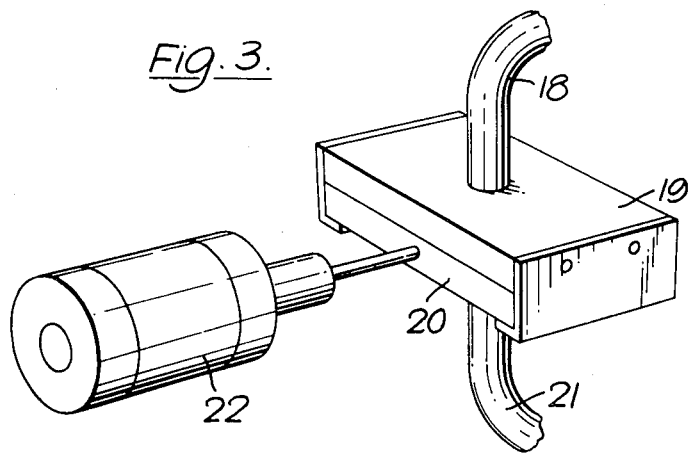
FIG. 3 shows a light switch for the structure of FIG. 2 in an open position.
Figure 4:
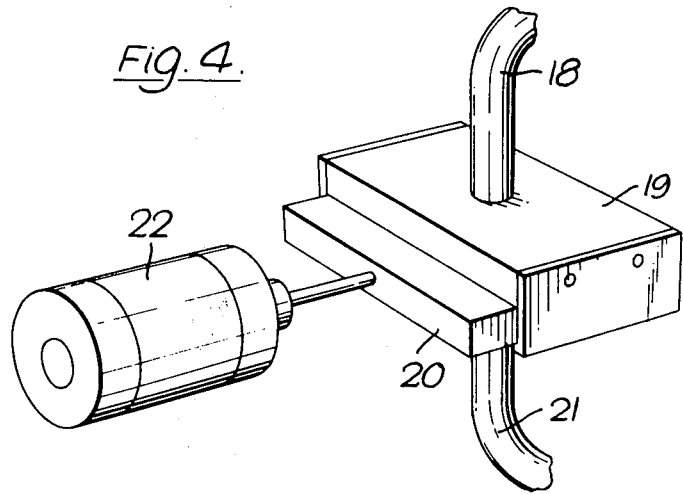
FIG. 4 shows the light switch of FIG. 3 in a closed position.

In FIGS. 3 and 4 there are shown two fibre optic terminal members 19 and 20. In FIG. 3 the terminal members 19 and 20, which together form an optical switch, are placed together and are in alignment, allowing light from the fibre optic 21 to pass directly through to the fibre optic 18. In FIG. 4 a solenoid 22 is shown as having pulled a terminal member 20, so as to cause misalignment between the terminal member 20 and 19. The fibre optics 21 and 18 are therefore misaligned, and no light passes to the base 13 of a particular cell shown in FIG. 1 as being below D. Each solenoid 22 is controlled by the control means 9 which has buttons for each cell 10 and therefore each frame of the microfiche.

Each fibre optic 21 is taken to central terminal member 23 illuminated by a single lamp 24. In order to remove the necessity for the optics 21, it may be possible to incorporate the terminal members 19 and 20 in a single light box.

At the left hand side of FIG. 1 there is shown the means 7 for holding and positioning the second microfiche which is shown at a pick-up station P where both the first and second microfiche may be picked up. The first microfiche being held exposed is inserted through a light excluding gate, shown diagrammatically at 30, between rollers 31 to a position above a cassette 32 which is full of unexposed film.

In operation the device shown in FIGS. 1 to 4 is operated by inserting a first microfiche through the gate 30 and rollers 31 to the pick-up station P. A sensor, not shown, adjacent to the rollers 31 indicates to a control system which drives the vacuum platten 7 by means of a helical drive 33 to station P. The vacuum platten 7 picks up the first or exposed microfiche, and deposits this on the array of collimating light cells 10 at station Q. The vacuum platten 7 having released the first microfiche 6 returns to station P where an unexposed microfiche 8 is drawn out of the cassette 32. The vacuum platten 7 is then returned by means of the helical drive activator 33 back to station Q, where the vacuum platten 7 is caused to drop slightly to bring the face of the unexposed microfiche 8 on to the back of the first or exposed microfiche 6 and the two microfiches are mutually aligned.

The operator next selects which frames are to be transferred from the first microfiche to the second microfiche. For instance, as is indicated in the drawings all the frames with the exception of frame D$a$ by pressing of the buttons on the control means 9 except for button D$a$. When a take button is pressed, the lamp 24 illuminates all the cells 10 with the exception of cell D$a$, and all the frames except the frame corresponding to cell D$a$ are recorded on the second microfiche. The second microfiche is then pulled upwards by raising the platten 7, which transfers it to station R where the frame corresponding to D$a$ is aligned at D' in the optical axis of lens 2. A camera take button is then pressed and a document 35 on the document platten 3 is recorded on the remaining unexposed frame of the second microfiche.

Although only one vacuum platten 7 has been shown in the drawings for the sake of simplicity, it is possible and probably advantageous to use a split platten as described in my British Pat. No. 1 425 660.

Figure 2:
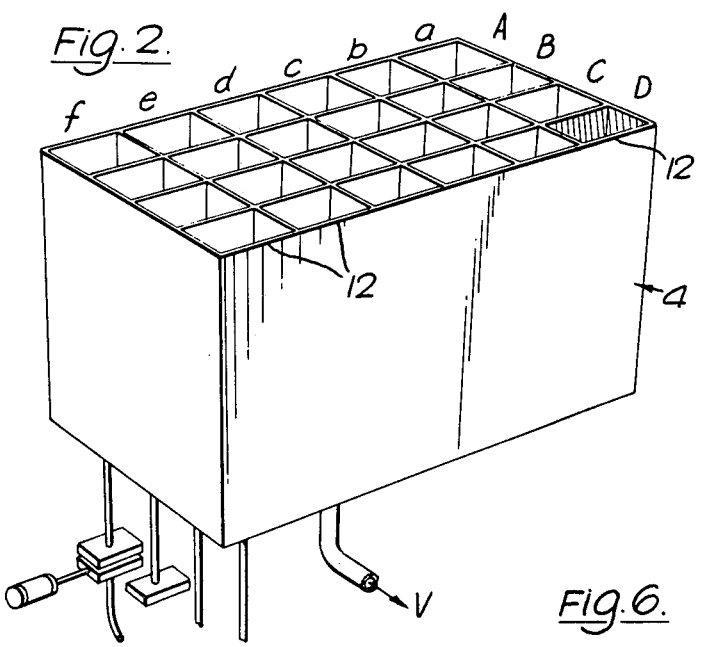
FIG. 2 shows a cellular collimating structure for the device of FIG. 1.

In FIG. 5 a second editing device is shown which consists of light cells 50 similar to light cells 10 of the first embodiment. At the base of each light cell a mirror 51 controlled by a solenoid 52 forms with a single lamp 53 the illuminating means for each light cell 50. The mirrors and solenoids 51 and 52 are incorporated within a vacuum chamber 57 which acts in the same way as the embodiment shown in FIG. 1, to hold a microfiche on the head of the light cells 50. The lamp 53 is provided with a condensing lens 54 and it may be possible to provide further condensing lenses 55 within each light cell 50. The general lay-out of the second embodiment is similar to that shown in FIG. 1, but the embodiment shown in FIG. 2 is shown without the co-operating microfiche camera and Station R' is only provided with a dump chute 56 for disposal of exposed microfiches to a further station.

In the embodiments shown, a vacuum is applied to the vacuum chambers 16 and 57, but alternatively an over pressure can be applied in these chambers to force the microfiches upwards onto the platten 7.

In the embodiment shown in FIG. 1, it may be advantageous to have the device 1 next to the gate 30 and the cassette 32 in the position between the device 1 and lens 2.

Figure 6:
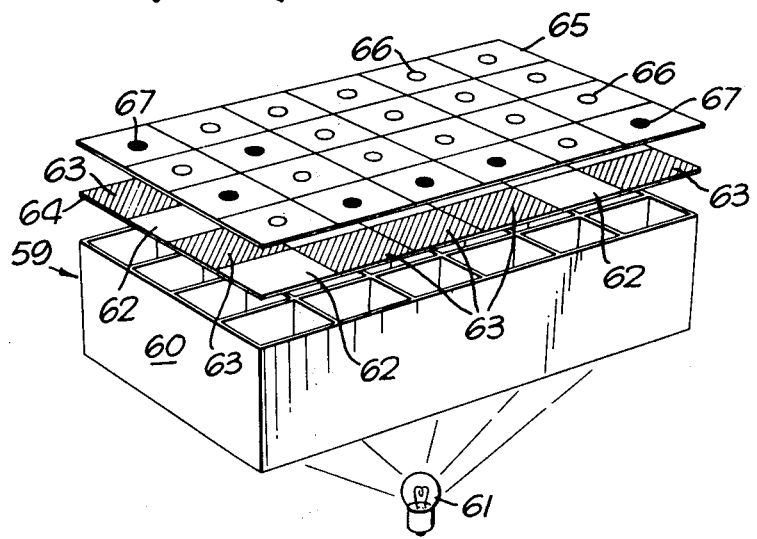
FIG. 6 shows a selector for use with the embodiments of FIGS. 1 or 5.

In a further feature of the invention shown in FIG. 6, a selector is provided which indicates to the collimator box which cells are to be illuminated. The selector 59 is provided between the gate 30 and device 1 and consists of an illuminator box 60 lit by one or more lamps 61 which projects light through the frames 62 and 63 of the microfiche 64 which is to be copied. Frames 62 are unexposed (i.e. empty) frames and frames 63 are exposed frames, and are therefore more opaque than frames 62. Above the microfiche 64 a grid 65 of photo electric cells 66 and 67 each corresponding to a frame 62 or 63 are provided. The cells 66 have detected empty frames 62 whilst the cells 67 have detected exposed frames 63. It is therefore possible to indicate on a screen which frames of the microfiche have images recorded on them and this information can be used to determine which cells 10 of the device are to be illuminated. If required the information can be used directly to cause the cells to be illuminated with or without the necessity of providing an indicating screen. The advantage of the selector is that a microfiche which needs additional frames added can be fed to the selector which will automatically set up the collimator illumination and immediately record the frames recorded on the old microfiche onto the new microfiche which is then passed to station R for the lens 2 to record the additional frames.

In order to obtain the highest resolution for copying one microfiche onto the other in the editing device of the invention, it has been found best to place the original microfiche and copy on the editing device emulsion to emulsion. By doing this there is no intervening separation of the emulsions as would occur if both fiche were placed with the emulsion the same way up. The separation in this latter case would be the thickness of the microfiche base which is in the order of 0.1–0.2 mm.

When copying with the emulsions placed together the copy is of course the reverse of the original. This reversal of image is advantageous in that complementary fiches can be made by this method. Complementary fiches and their use are described in my U.S. Pat. No. 3 935 538. Thus the editing device provides a very useful means of forming complementary fiches. When copying by this means the original fiche is a first generation fiche and the first copy from the original which is a complementary fiche is a second generation fiche. The original or first and second generation fiches are conveniently retained as a master fiche from which subsequent copies can be made. Third generation fiches copied from the second generation fiche will of course be reproductions of the first generation fiche and second or fourth generation fiches copied from the first or third generation fiches will be complementary to the first generation fiche. This method ensures that emulsion to emulsion copying is continually maintained through any number of the updated copies, updating being carried out on the third or subsequent odd number of generation copies or on the fourth or subsequent even number of genration copies depending on whether complementary (i.e. reverse) copies are required or obverse (i.e. original aspect) copies are required. A running record of updating and correspondence is thereby maintained.

It will be appreciated that the invention covers a method of copying one microfiche onto at least a partly unexposed microfiche. That is to say the microfiche onto which images are being recorded may have already been partly exposed in an earlier editing or updating operation. Thus it will be appreciated that one microfiche copy may have images from two or more original microfiches. Indeed it is one of the advantages of the apparatus of the invention that only parts of an unexposed microfiche may be exposed, thus leaving to a further operation the full exposure or blanking out of frames. Blanking out of frames is sometimes required in making color fiche. The invention therefore provides for a particularly broad and adaptable use whereby several different copying methods can be employed to produce ordinary copies, complementary copies and color copies for both ordinary or complementary fiche.

Having described our invention, we claim:

1. A microfiche editing device for copying images from one microfiche to another comprising a plurality of cells, each cell corresponding to a frame of a first microfiche to be held on the device and each having a rectilinear cross section substantially the same as each said frame, an array of illuminating means, one for each cell, means for holding the first microfiche on the device, means for holding and positioning a second, at least partly unexposed, microfiche in alignment with the first microfiche, light switching means associated with each of said illuminating means and a control means controlling each light switching means to project light through any one or more desired frames on the first microfiche onto an unexposed frame or frames on the second, microfiche, whereby images on several frames on the first microfiche can be simultaneously copied onto the second microfiche.

2. A device according to claim 1 wherein the length of each cell is longer than the longest side of the cross section as taken from the base to the head of each cell.

3. A device according to claim 2 where the head of each cell is in a single plane so as to form a grid onto which the first microfiche can be held in said single plane.

4. A device according to claim 2 wherein the means for holding the first microfiche on the device comprises a vacuum chamber, ducts connecting the chamber to each cell, the chamber being arranged to be connected to a source of pressure lower than the ambient atmosphere.

5. A device according to claim 1 wherein the light switching means comprises a mirror at the base of each cell which cell can be shut so as to exclude light from the cell or opened to direct light into the cell.

6. A device according to claim 5 wherein each mirror is hinged from an illuminating position to a light excluding position and wherein the movement of each mirror is controlled by the control means.

7. A device according to claim 1 wherein each illuminating means comprises a fibre optic, one end of which is held in a terminal member which can be moved into alignment or misalignment relative to a further terminal member to provide a light switching means, the further terminal member being illuminated by a lamp, alignment or misalignment being controlled by the control means.

8. A device according to claim 1 further comprising a selector indicating which cells are to be illuminated, the selector comprising a grid of photo electric detectors one to each cell, each detector placed so as to record light projected through the first microfiche placed over the cells to detect full or empty frames of the first microfiche, and wherein the detectors are connected to a screen arranged to display the status of full or empty frames.

9. A method of copying a plurality of selected images in different frames of one microfiche onto another at least partly unexposed microfiche comprising placing both microfiches together on a cellular structure having a plurality of cells, each cell having a rectilinear cross section corresponding to a microfiche frame and in alignment with said frame, selecting those image frames to be transferred from the one microfiche to the other microfiche, transmitting light to the base of each cell corresponding to each image frame to be transferred and projecting light through the plurality of images to expose a plurality of frames of the other microfiche simultaneously to the plurality of selected images.

10. The method of claim 9 wherein the two microfiches are placed together emulsion to emulsion to thereby obtain an exposed image which is the reverse of the original image.

* * * * *